(12) United States Patent
Juels et al.

(10) Patent No.: US 7,461,399 B2
(45) Date of Patent: Dec. 2, 2008

(54) PIN RECOVERY IN A SMART CARD

(75) Inventors: Ari Juels, Brookline, MA (US); Ryan Culbertson, Boston, MA (US); Andrea Doherty, Cambridge, MA (US); Darren Dupre, Westford, MA (US); Norik Kocharyan, Burlington, MA (US)

(73) Assignee: RSA Security Inc., Bedford, MA (US)

( * ) Notice: Subject to any disclaimer, the term of this patent is extended or adjusted under 35 U.S.C. 154(b) by 902 days.

(21) Appl. No.: 10/903,898

(22) Filed: Jul. 30, 2004

(65) Prior Publication Data

US 2006/0037073 A1 Feb. 16, 2006

(51) Int. Cl.
*H04L 9/00* (2006.01)

(52) U.S. Cl. ............................. 726/9; 705/65

(58) Field of Classification Search .................. 726/20; 705/72; 725/30
See application file for complete search history.

(56) References Cited

U.S. PATENT DOCUMENTS

| | | | | |
|---|---|---|---|---|
| 4,528,442 | A * | 7/1985 | Endo | 235/379 |
| 4,801,787 | A | 1/1989 | Suzuki | |
| 6,351,813 | B1 * | 2/2002 | Mooney et al. | 713/185 |
| 6,390,374 | B1 * | 5/2002 | Carper et al. | 235/492 |
| 6,895,502 | B1 * | 5/2005 | Fraser | 713/168 |
| 2003/0041270 | A1 | 2/2003 | Cheng | |
| 2003/0106935 | A1 | 6/2003 | Burchette et al. | |
| 2004/0078775 | A1 | 4/2004 | Chow et al. | |
| 2005/0154897 | A1 * | 7/2005 | Holloway et al. | 713/183 |

FOREIGN PATENT DOCUMENTS

| | | |
|---|---|---|
| EP | 0880116 | 11/1998 |
| WO | WO-95/24696 | 9/1995 |

OTHER PUBLICATIONS

International Search Report of PCT/US2005/026602, Jun. 8, 2006, 3 Pages, European Patent Office.
Frykholm, N., et al. "Error-Tolerant Password Recovery," CCS'01 Nov. 2001, ACM 1-58113-385-5/01/0011 (9 pgs.).
Ellison, C., et al., "Protecting Secret Keys with Personal Entropy," Elsevier 1999 (13 pgs.).
Brainard, J., et al., "A New Two-Server Approach for Authentication with Short Secrets," RSA Laboratories (13 pgs.) 2003.

* cited by examiner

*Primary Examiner*—Matthew B Smithers
(74) *Attorney, Agent, or Firm*—BainwoodHuang

(57) ABSTRACT

A method of controlling access to resources on a smart card, the method involving: providing a list of n questions for presentation to the user, where n is an integer; receiving from the user answers to questions among the list of n questions; determining how many of the received answers are correct; and if a sufficient number of the n questions was answered correctly, granting access to the resources on the smart card.

28 Claims, 2 Drawing Sheets

PIN RECOVERY IN A SMART CARD

TECHNICAL FIELD

This invention relates to smart cards.

BACKGROUND OF THE INVENTION

Deployments of smart cards are typically large, requiring customers to carefully manage enterprise costs for installation and configuration, maintenance, help desk, and training. The sum of these costs equates to the total cost of ownership (TCO). Given the size of smart card deployments, organizations have understandably identified reduction of the TCO as a key strategic goal (e.g., the U.S. Army). Among the items contributing to the TCO, one major source is help desk support.

In today's world of password/PIN-based access to computers, Web sites, and ATMs, help desks must service a growing number of requests for recovering forgotten passwords and PINs. As a result, Web sites that offer password-based access are including automated user-administered PIN and password recovery features. Their intent is to offset the high cost of live help desk support, which is typically a significant amount per user. So, for a large organization, the cost of help desk support can be very large.

With smart cards, the help desk cost potential is even higher. Not only do users forget their PIN, some try to remember their PIN by making multiple login attempts, which eventually locks their card or puts it into a locked state. Before the user is able to use the card again, it must then be taken to administrator who has a special key for unlocking the card. Thus, the help desks must service forgotten PIN requests and PIN Unlock requests. Because the user's PIN is not archived on a server, the help desk cannot do anything to prevent the user from locking their card.

The typical help desk process for servicing a PIN-locked card includes the following steps. The user physically carries the card to the help desk and requests that the PIN be unlocked. The help desk asks user for some basic identification information, and asks a security question, such as "What is your mother's maiden name?" If the user successfully answers the security question, the help desk unlocks the PIN, and gives the user a new PIN.

Not only are help desk costs higher for smart card PIN recovery than Web site password recovery, depending on smart card usage, the user may not be able to login to their computers and/or read protected e-mail messages until the card is returned.

SUMMARY OF THE INVENTION

In general, in one aspect, the invention features a method of controlling access to resources on a smart card. The method involves: providing a list of n questions for presentation to the user, where n is an integer; receiving from the user answers to questions among the list of n questions; determining how many of the received answers are correct; and if a sufficient number of the n questions was answered correctly, granting access to the resources on the smart card.

Other embodiments include one or more of the following features. The "sufficient number" is equal to m, where m is an integer that is not greater than n. Alternatively, the "sufficient number" depends on which of the n questions among the list of n questions was answered correctly. The method also involves: causing the user to be prompted to enter a password as a condition for granting access to the resources on the smart card; and receiving input from the user in response being prompted to enter the password, wherein providing the list of n questions is in response to receiving input from the user.

Still other embodiments include one or more of the following features. The received input is an entered password and the method further involves determining that the entered password is incorrect, and wherein providing for presentation to the user the list of n questions is in response to determining that the entered password is incorrect. Determining involves comparing the received answers to answers that are stored on the smart card. If less than m of the received answers is correct, locking the smart card so that access to the resources on the smart card is blocked to the user. The method also involves: storing the list of n questions on the smart card; and storing on the smart card a correct answer for each of the questions in the list of n questions. Storing the list of n questions on the smart card involves storing the list of n questions as a list of indices, each of which corresponds to a different one of the questions on the list of n questions. Storing the correct answer for each of the questions in the list of n questions involves storing the correct answers on the smart card in text form or, alternatively, in a hashed form. Comparing involves using a measure of closeness to determine whether that received answers are correct, wherein the measure of closeness identifies an entered answer to any selected one of the questions on the list of m questions as correct even though that entered answer is not identical to the corresponding answer stored on the smart card. The value of m is less than n, e.g. n equals 5 and m equals 3. The received input instructs the smart card to bypass password entry. Receiving input from the user involves receiving from the user an incorrect password p times in succession, wherein p is an integer (e.g. p is equal to 3).

In general, in another aspect, the invention is a smart card including: a microprocessor; an interface through which the smart card interfaces with a card reader; and memory storing a password for enabling a user to gain access to resources on the smart card, a list of n questions along with answers thereto, and code which when executed on the microprocessor causes the microprocessor to: cause the user to be prompted to enter the password as a condition for granting access to the resources on the smart card; accept input from the user in response to being prompted to enter the password; based on the received input from the user, provide a list of n questions for presentation to the user, where n is an integer; receive from the user answers to questions among the list of n questions; determine how many of the received answers are correct; and if at least m of the received answers are correct, grant access to the resources on the smart card, wherein m is an integer that is not greater than n.

Other embodiments include one or more of the following features. The received input is an entered password, and the code further causes the microprocessor to determine that the entered password is incorrect and causes the microprocessor to provide for presentation to the user the list of n questions in response to determining that the entered password is incorrect. The code also causes the microprocessor to determine how many of the received answers are correct by comparing the received answers to answers that are stored on the smart card. The code causes the microprocessor to place the smart card in a locked state if less than m of the received answers is correct, wherein the locked state blocks the user from gaining access to the resources on the smart card. The list of n questions is stored as a list of indices, each of which corresponds to a different one of the questions on the list of n questions. The correct answer for each of the questions in the list of n questions is stored in text form or, alternatively, in a hashed form. The code causes the microprocessor to compare the received answers to answers that are stored on the smart card by using a measure of closeness to determine whether that received answers are correct, wherein the measure of closeness identifies an entered answer to any selected one of the questions on the list of m questions as correct even though that entered answer is not identical to the corresponding answer stored on the smart card. The value of m is less than n. The received input instructs the smart card to bypass password entry.

The details of one or more embodiments of the invention are set forth in the accompanying drawings and the description below. Other features, objects, and advantages of the invention will be apparent from the description and drawings, and from the claims.

DETAILED DESCRIPTION

Overview

Figure 1:
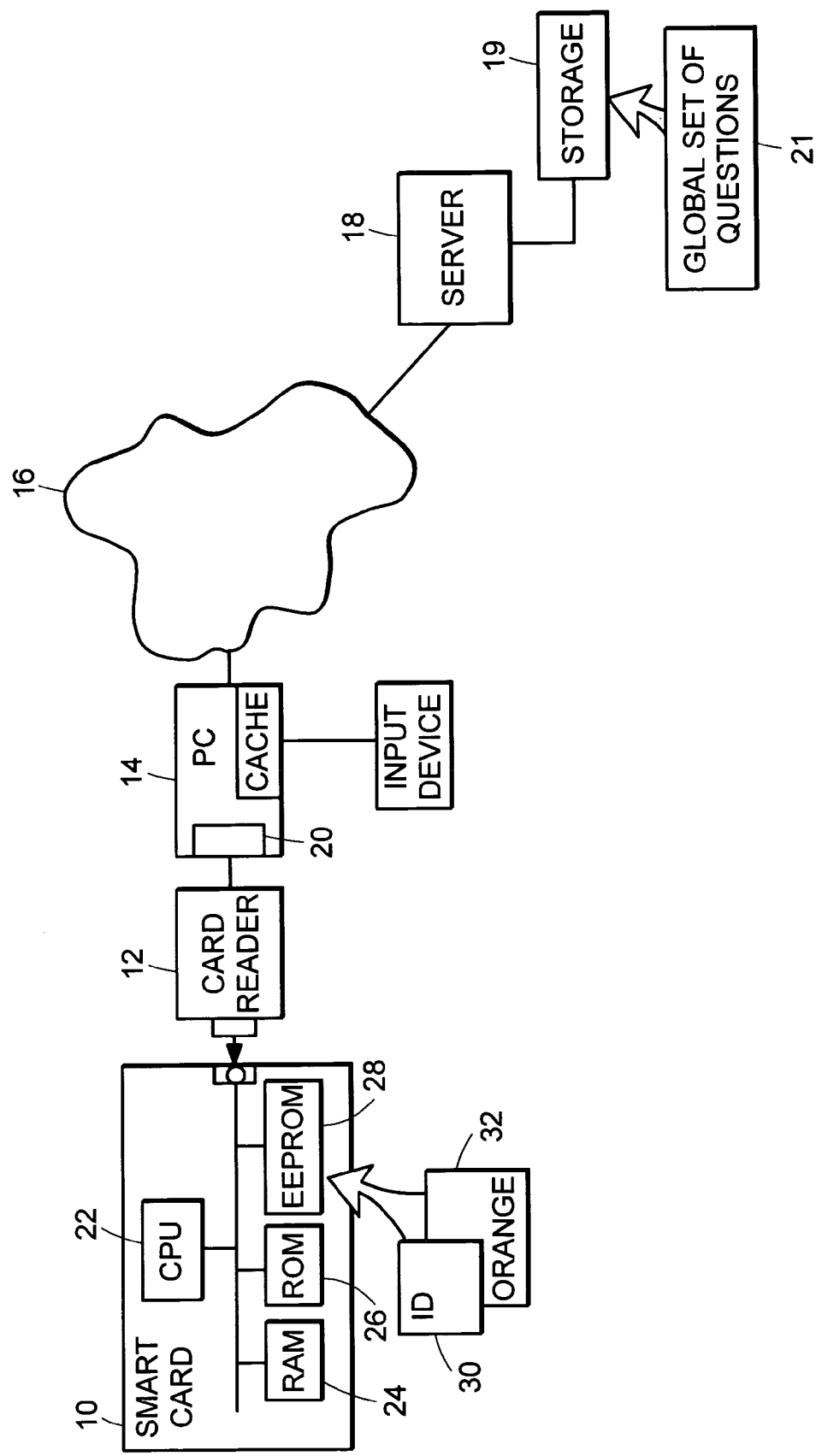
FIG. 1 is block diagram of a system which employs a smart card.

The embodiment described herein is smart card that includes a PIN/Password Recovery System (PPRS). The PPRS enables a user to avoid going directly into a locked card state when the user forgets the PIN. In general, it does this by offering another mechanism by which the user is able to gain access to the functionality of the card. In the course of registering for an account, the user provides answers to a small collection of personal or life questions, e.g., "What is your mother's maiden name?" or "What was the name of your first pet?" This information is then stored on the smart card. When the user uses the card, the card first requires that the user enter the correct PIN. If the user is unable to do so or repeatedly enters an incorrect PIN, instead of entering a locked state, the card offers the user an opportunity to provide correct answers to some predetermined number of the registered questions. If the user is able to provide those answers, then the card gives the user access to the stored PIN and to other functionality on the card, as though the user had entered the correct PIN. If the user is unable to provide the requisite number of correct answer, then the card goes into a locked state requiring an administrator to unlock it and provide a new PIN.

The PIN recovery system described herein is implemented on an RSA SecurID 5100 Smart Card. This smart card is commercially available from RSA Security, Inc. of Bedford, Mass. It incorporates Java Card technology that is based on Java Card 2.1.1. Java Card technology provides a customized subset of core and extension Java packages and classes for programming smart card applications. This enables the smart card to easily support multiple applications and provides the mechanism by which the PPRS features are implemented in the card.

In one embodiment, the smart card includes at least two applets that are relevant to the PIN feature of the card. It includes an ID applet and a Password/PIN Recovery Applet (a PPRS applet). In general, the ID applet requests the PIN from the user and checks whether the user supplied PIN against the stored PIN to determine whether the user will be allowed to have access to other functionality on the card. The PPRS applet provides the mechanism for accessing the smart card when the stored PIN has been forgotten. It is activated upon the entry of an incorrect PIN and in combination with the ID applet defines a set of fail states of increasing severity. It is also referred to herein as an Orange Applet, drawing on the common nomenclature of "green," "yellow," "orange," and "red" which identify the various states that they establish for the card.

In essence, the Orange Applet puts the administration of forgotten PINs into the users' hands. This applet provides a mechanism for permitting users to recover or reset their PIN before their card becomes locked. The consequence of including this feature on the smart card is a reduction in the number of PPRS-related help desk service requests, which in turn decreases the TCO associated with these smart cards.

Before describing in greater detail the operation of the smart card, an overview of the system will first be presented.

Hardware Description:

FIG. 1 shows the overall architecture of a system that includes the smart card 10. The system includes a smart card reader 12, a PC 14, a communications network 16 (e.g. the Internet), and a remotely located server 18. Smart card reader 12, which is the physical interface into which the user plugs the smart card, is connected to PC 14, which is in turn connected to communications network 16. PC 14 includes interface software 20 that enables it to communicate with the smart card and it includes communication software (not shown) that enables it to communicate with server 18 over communications network 16. PC 14 is also equipped with a standard input device 15 (e.g. keyboard) that enables the user to interact with the system and enter the required information.

The depicted smart card system employs PIN authentication to authenticate the user to the card so the user can perform various cryptographic functions, e.g. encrypting private data, secure storage, encrypting, reading private data, writing information, performing a private key operation when encrypting data, etc. In the described embodiment, these functions are provided by various applets on the card.

Smart card 10 includes an 8 bit CPU microcontroller 22, RAM (random access memory) 24, ROM (a read-only memory) 26, and EEPROM (Electrically Erasable Programmable Read Only Memory) 28. RAM 24 provides temporary storage where the processor performs computations. ROM 26 provides permanent storage that houses the operating system. And EEPROM 28 is re-writable memory for storing the application data and code.

Smart card 10 also includes other features commonly found on smart cards such as the RSA SecurID 5100 smart card, such as on-board tamper-resistant hardware that prevents an unauthorized party from gaining access to the private information stored within the card. These other features will not be described here since they are well known and are of less relevance to the functionality described herein.

Details of the Applets

In the described embodiment, smart card includes various applets, which are separate code entities. As specified in the Java Card specification, code firewalls are provided between the applets so that they cannot talk to each other. The firewalls are designed to enhance security. The individual applets are provided with an interface that allows them to share certain functions with other applets. Among the various applets that are in smart card 10, the two that are of particular relevance are an ID applet 30 and an Orange applet 32. ID applet 30 provides the services that enable a user to access the functionality and private content of the card by submitting the correct PIN. Orange applet 32 provides the services that enable a user who has forgotten the PIN to access that functionality and private content by answering a requisite number of life questions.

Orange applet 32 supports a number of services of which the following are of particular relevance here. It supports: Enroll; Reset; Get Status; GetEnrolledIndexes; and Validate. Each of these will now be described in greater detail.

The Enroll command allows the user to enroll with a fixed set of questions and answers to them. The questions are identified by index number and the answers are stored in hashed form. In the described embodiment, there is a two-byte question index number and a twenty-byte hash of the answer. The question index and its corresponding hash value are referred to as a Q&A pair. This command will not be processed if the number of Q&A combinations is less than a preset required minimum defined at install time of the applet.

The Q&A are submitted to the applet in the form of an array: life[question_index][hash_of_answer].

The command supports multiple batches in case the array size is larger than the maximum size of the block of information that can be transferred at one time.

The Reset command resets the Orange Applet to its original "Not Initialized" state. This causes all question indexes/answer hashes and protected data (e.g. PIN) to be discarded. After the applet has been reset, it can be re-enrolled by using the "Enroll" service.

The Get Status command is used to get the status of the Orange Applet with relation to the ID applet state. In other words, the output will be one of the following:

| | |
|---|---|
| Not-Present | Orange applet is not present on the card |
| Not-Initialized | User has not enrolled |
| Not-Active | User has been enrolled but the number of incorrect PIN verifications has not reached a point at which the applet needs to be activated |
| Active | Applet has been activated due to a defined number of incorrect PIN verifications |
| Locked | Orange Applet and ID applet are locked. A PIN Unblock command is needed to bring the card back to the unlocked state. |

The GetEnrolledIndexes command is used to obtain a list of question indexes that a user has enrolled with.

The Validate command is used to submit a set of question indexes and answer hashes in order to obtain the protected PIN. This service will terminate with an error if the number of Q&A combinations submitted is less than a minimum required number of correct combinations required to retrieve the protected PIN. If the number of correct answers has been satisfied, then the protected PIN will be returned by this service. Otherwise, the incorrect try count of the ID applet will be incremented.

Figure 2:
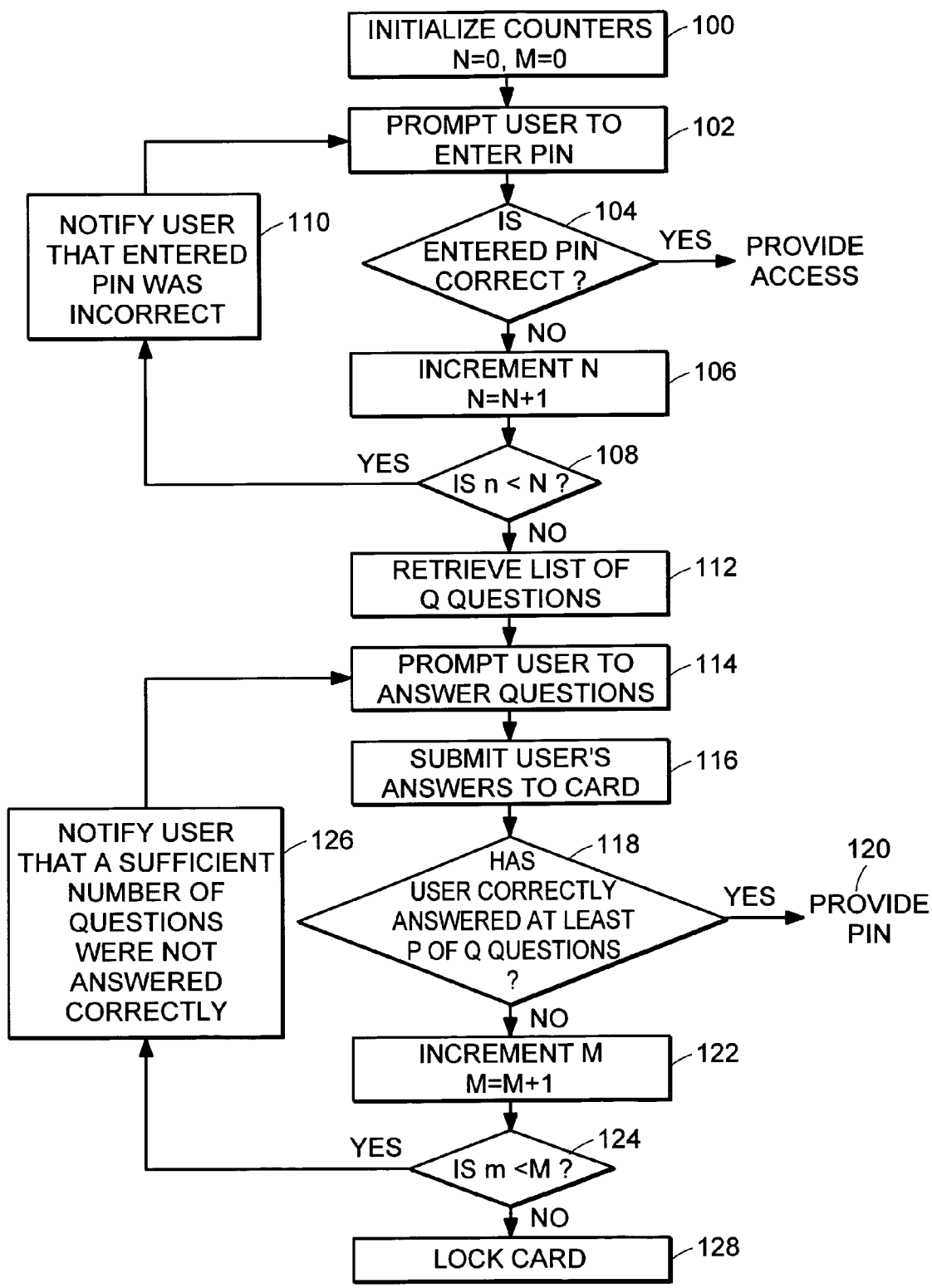
FIG. 2 is a flow diagram of the process implemented by the smart card depicted in FIG. 1.

Flow Chart:

As stated above, the smart card has four states, referred to as "green," "yellow," "orange," and "red." The smart card moves through these states in the manner shown in FIG. 2. Initially, the smart card starts in what is referred to as the "green" state, and depending on what information the user enters into the system may progress to the yellow state, then the orange state and finally to the red state in which the card is locked.

In the green state, the card functions normally. The system prompts the user to enter the PIN (step 102) and it initializes two variables, n and m, which are to be used later if the user cannot remember the correct PIN (step 100).

The system passes the entered PIN to the card which checks it against the stored PIN to see if they match (step 104). If the user has entered the correct PIN, the card allows the user to access the protected functionality and private data on the card. However, if the user enters an incorrect PIN, the card transitions to the "yellow" state at which point it increments n, which is the variable used to keep track of how many times the user has entered an incorrect PIN (step 106). In this state, the user is given a preset number (N) of opportunities to enter the correct PIN.

The card first checks whether the variable n has reached N (step 108). If n is less than N, the system notifies the user that the entered PIN was incorrect (step 110) and it again prompts the user to enter the correct PIN (step 102). If n is not less than N, indicating that the user has tried N times to enter the correct PIN but was unable to do so, the card transitions to the orange state.

In the orange state, the card launches the orange applet, which causes the system to retrieve the list of questions (step 112) and then prompt the user to answer these questions (step 114). The user's answers are hashed and then submitted to the card (step 116). The card, in turn, compares the submitted answers to the stored answers and determines whether the user has correctly answered a sufficient number of the questions (e.g. P of Q wherein P=3 and Q=5) (step 118). If the user has correctly answered a sufficient number of the questions, the card provides authorization for the user to access the requested resources on the system and requires the user to reset the PIN (step 120).

On the other hand, if the user has not correctly answered a sufficient number of the questions, the card increments m (step 122) and checks whether the new value of m is less than a preset value, M (step 124). If the value of m is still less than M, the system notifies the user that a sufficient number of questions were not answered correctly (step 126) and then again prompts the user to answer the questions (step 114). This continues until either the user succeeds in answering enough questions correctly or until m=M. In other words, successful entry of the requisite number of answers prior to some pre-determined number of attempts enables the user to recover or reset the PIN for the card in accordance with system policy.

If the user fails to answer a sufficient number of the questions before m=M, then the card transitions to the red state in which the card is locked (step 128). In the locked state the card become inoperable and will remain so until an administrator (or some person with sufficient authority) unlocks the card.

In the embodiment just described, the orange applet authorizes access without disclosing the PIN (i.e., PIN does not leave the card). For example, it can pass the PIN to the ID applet through the shared interface between the ID applet and the orange applet. The ID applet having received the PIN would then grant access to the appropriate resources. An alternative is for the orange applet to return the PIN to the interface software that is running on the PC which then submits the PIN to the ID applet. In this case, the PIN would be sent off of the card and then be resubmitted to the card. To the ID applet it would appear that the user had submitted to correct PIN. Of course, the former approach offers the advantage of greater security as compared to this latter approach.

Also, it should be understood that the details of algorithm shown in FIG. 2 are merely illustrative. There are various alternative ways of implementing the functionality embodied therein and this particular way is not meant to be limiting in any way.

Security Goals Considerations:

The Orange Applet adds a layer of protection to cardholder verification, which significantly reduces the potential of a user locking their PIN. Since this layer of protection involves releasing a PIN to the user or resetting the PIN, the following security goals should be observed. First, the answers to life questions should be kept in a private data container to prevent identity theft. Since the PIN is not available, read/write access can be controlled using a secure messaging protocol. Second, he life questions should be selected to have a high degree of entropy, or randomness, from an attacker's perspective. At the same time, the answers to the life questions should be selected to be of a type that is recallable by the user in a consistent form. For example, a question about someone's favorite color has very low entropy from an attacker's point of view, although easy for the user to remember. In contrast, questions about the user's childhood or early adulthood have high entropy. Third, to ensure the Orange Applet provides a degree of randomness that would prevent an attacker from bypassing the orange state, the user must answer k out of m questions correctly to authenticate successfully. In a typical online situation, m might be 5 and k might be 3. Note that k and m can be parameterized as desired, provided that enough overall entropy is retained to thwart an attacker.

Policy will dictate whether answers that a user provides are visible from the screen as the user enters them. In most environments, this would be acceptable, although some security policies may require the answers to be displayed as a series of asterisks, as is currently done for password entry.

Implemented with these goals in mind, the Orange Applet offers a level of security generally superior to that of PPRS systems in Web environments. In a Web-based system, answers to life questions, or derivative data permitting their verification (e.g., hash images), must be stored and checked on a centrally accessible server. This gives rise to a host of serious security and privacy-related vulnerabilities. By contrast, thanks to its on-board tamper-resistant hardware, a smart card can achieve a high level of security through local storage and on-card verification of answers to life questions.

Life Questions:

In the above-described embodiment, there is a global set of questions 21 that are maintained in a storage device 19 to which server 18 has access (referring to FIG. 1). It is from among this global set of questions that each particular user will select the ones that are to be used for that user. The population of smart card holders will often be very large and each of those users is likely to have his or her own views on what the appropriate set of questions should be. Thus, the global set will need to be sufficiently large and varied to adequately support those users.

In the global set, the questions are all indexed so that each question is identified by a corresponding different index. It is these indices along with the hash of the user's answers that are sent to the smart card when the smart card is enrolled. To avoid having to connect with the server to get the questions whenever a user tries to use his or her smart card in any reader hooked up to that PC, a copy of the global set of questions is also stored in cache or memory within or directly accessible to the PCs. When the PC needs to present the questions to the user, it retrieves the list of index numbers from the smart card and then, referring to the copy of the global set stored in its local database, determines what the actual questions are that are to be presented to the user. After the user has submitted answers to the questions, the PC hashes the answers and then submits the indices plus the hashed answers to the card.

Because the global set of questions is likely to change from time to time as the set of questions is improved or as the smart card technology is internationalized and offered to other user groups in other regions or countries, it will be necessary to update the copies stored local to the PCs. Thus, there needs to be a mechanism for periodically synchronizing the locally stored copies with the centrally stored global set of questions at the server.

In the above-described embodiment, the answers to the life questions are stored on the smart card as hashes. So, the users answers must produce a direct hit in order to be declared a match. That is, they must be exactly the same as the stored answers. Another approach is to store the answers on the card in text form. There are two advantages of doing this. First, if the user forgets the answer to some questions but remembers a threshold number of answers, the card can play back the forgotten answers to the user. Also, one can more easily define a more flexible metric for testing whether the answers provided by the user are close enough. Under such an approach a hit can occur without it being a direct hit.

One way to implement such a flexible metric is by comparing the plain text answer to stored plain text answer and computing a measure of closeness. There are various ways known in the art of comparing two things and generating a measure of closeness. For example, one could use pattern matching, determine the degree of overlap of substrings within the stored answer and the given answer; or employ some other measure of distance.

A problem with storing the plain text answers is that the length of the answers that will be provided by the user will not be known ahead of time. Thus, the amount of storage space that should be set aside for storing answers cannot be easily predetermined. And since storage space is very limited on smart cards.

In the embodiment described above, the orange applet was separate from the ID applet. This offers the advantage that the orange applet can be downloadable into the smart card. An alternative approach, which does not offer this advantage of downloadability, is to incorporate the orange applet functionality into the ID applet itself.

In still another implementation, the smart card can send the PIN off of the card and the application on the PC submits the PIN to the ID applet as though a user had entered it through the client. This essentially simulates user entry of PIN and the receiving applet will not be aware that it is not the user that is submitting the PIN. Because the PIN leaves the card this raises certain security concerns. However, this presents a way of upgrading existing cards that are in the hands of consumers and for which the interface or the ID applet cannot be changed.

Another alternative to the above-described algorithm worth mentioning explicitly is to modify the options available to the user when the card is in a yellow state. The user could be given the option of either the correct PIN or of going directly into the orange state in which the user will be presented with the questions. The user might know that multiple attempts to enter the correct PIN are futile since it truly has been forgotten. Thus, he may not want to go through repeatedly entering an incorrect PIN and would prefer to go straight to the questions.

Though the particular implementation of the technology described herein involved Java-based smart cards, other smart card technologies could also be used. The Java applet is one particularly appealing way of providing the described functionality on the smart card. But any way that provides that functionality on the smart card would also be acceptable.

The approach described above can also be modified for use on "dumb" cards, which are cards that are not capable of running code (i.e., they have no internal processor). In that case, one approach is to divide a master key up and distributed the parts among a set of password-protected files that are stored on the card. The password for each file is a different PIN that is derived from the answer to a different life question. Upon receiving correct answers to all of the life questions, the system is able to access the contents of all of the files and reconstruct the master key from the contents of those files. To increase the level of security and reduce the vulnerability to a dictionary attack, the card can also contain one or more salt values from which the PINs are derived. That is, each PIN is derived by applying a one-way function to the answer (or a hash of the answer) that is combined with the corresponding salt value.

As was pointed out above, an m-out-of-n threshold is not the only possible criterion for acceptance of answers. Alternatively, it could be that all answers are incorrect, but some are "close." For example, if all answers contain minor typos, a card could be programmed to still authorize access—even though it does not regard any of the provided questions as individually completely correct. Still another approach is to give the answers to some questions more weight than the answers to others and compute a cumulative score. More generally, correctness could be based on some monotonically increasing function of the correctness of the provided set of answers.

Other embodiments are within the following claims.

What is claimed is:

1. A method of controlling access to resources on a smart card, said method comprising:
    providing a list of n questions for presentation to the user, where n is an integer;
    receiving from the user answers to questions among the list of n questions;
    determining how many of the received answers are correct; and
    if a sufficient number of the n questions was answered correctly, granting access to the resources on the smart card;
    wherein said sufficient number is equal to m, where m is an integer that is not greater than n;
    further comprising:
    causing the user to be prompted to enter a password as a condition for granting access to said resources on the smart card; and
    receiving input from the user in response being prompted to enter the password, wherein providing the list of n questions is in response to receiving input from the user;
    wherein the received input is an entered password, said method further comprising determining that the entered password is incorrect, and wherein providing for presentation to the user the list of n questions is in response to determining that the entered password is incorrect.

2. The method of claim 1, wherein determining involves comparing the received answers to answers that are stored on the smart card.

3. The method of claim 2, wherein comparing involves using a measure of closeness to determine whether that received answers are correct, wherein the measure of closeness identifies an entered answer to any selected one of the questions on the list of m questions as correct even though that entered answer is not identical to the corresponding answer stored on the smart card.

4. The method of claim 2, wherein comparing the received answers to answers that are stored on the smart card comprises:
    weighting a first set of the received answers such that a weight associated with the first set of received answers is greater than a weight associated with a second set of received answers;
    comparing the received answers to answers that are stored on the smart card; and
    calculating a cumulative score associated with the weight associated with the first set of received answers and the weight associated with the second set of received answers;
    wherein if less than m of the cumulative score is correct, locking the smart card so that access to the resources on the smart card is blocked to the use.

5. The method of claim 1, wherein if less than m of the received answers is correct, locking the smart card so that access to the resources on the smart card is blocked to the user.

6. The method of claim 1, further comprising:
    storing the list of n questions on the smart card; and
    storing on the smart card a correct answer for each of the questions in the list of n questions.

7. The method of claim 6, wherein storing the list of n questions on the smart card involves storing the list of n questions as a list of indices, each of which corresponds to a different one of the questions on the list of n questions.

8. The method of claim 6, wherein storing the correct answer for each of the questions in the list of n questions involves storing the correct answers on the smart card in text form.

9. The method of claim 2, wherein storing the correct answer for each of the questions in the list of n questions involves storing the correct answers on the smart card in a hashed form.

10. The method of claim 1, wherein where m is less than n.

11. The method of claim 10, wherein n equals 5.

12. The method of claim 10, wherein m equals 3.

13. The method of claim 1, wherein the received input instructs the smart card to bypass password entry.

14. The method of claim 1, wherein receiving input from the user involves receiving from the user an incorrect password p times in succession, wherein p is an integer.

15. The method of claim 14, wherein p is equal to 3.

16. The method of claim 1, further comprising storing a password in the smart card, wherein granting access to the resources on the smart card involves sending the stored password to another module implemented on the smart card that is responsible for granting and denying access to the resources on the smart card.

17. A smart card comprising:
    a microprocessor;
    an interface through which the smart card interfaces with a card reader; and
    memory storing a password for enabling a user to gain access to resources on the smart card, a list of n questions along with answers thereto, and code which when executed on the microprocessor causes the microprocessor to:
    provide a list of n questions for presentation to the user, where n is an integer;
    receive from the user answers to questions among the list of n questions;
    determine how many of the received answers are correct; and
    if a sufficient number of the n questions was answered correctly, grant access to the resources on the smart card;

wherein said sufficient number is equal to m, where m is an integer that is not greater than n;

wherein the code further causes the microprocessor to:

cause the user to be prompted to enter the password as a condition for granting access to said resources on the smart card;

accent input from the user in response to being prompted to enter the password; and based on the received input from the user, provide the list of n questions for presentation to the user;

wherein the received input is an entered password, wherein said code further causes the microprocessor to determine that the entered password is incorrect, and wherein said code causes the microprocessor to provide for presentation to the user the list of n questions in response to determining that the entered password is incorrect.

18. The smart card of claim 17, wherein said code causes the microprocessor to determine how many of the received answers are correct by comparing the received answers to answers that are stored on the smart card.

19. The smart card of claim 17, wherein said code causes the microprocessor to place the smart card in a locked state if less than m of the received answers is correct, wherein the locked state blocks the user from gaining access to the resources on the smart card.

20. The smart card of claim 17, wherein the list of n questions is stored as a list of indices, each of which corresponds to a different one of the questions on the list of n questions.

21. The smart card of claim 17, wherein the correct answer for each of the questions in the list of n questions is stored in text form.

22. The smart card of claim 17, wherein the correct answer for each of the questions in the list of n questions is stored in a hashed form.

23. The smart card of claim 17, wherein the code causes the microprocessor to compare the received answers to answers that are stored on the smart card by using a measure of closeness to determine whether that received answers are correct, wherein the measure of closeness identifies an entered answer to any selected one of the questions on the list of m questions as correct even though that entered answer is not identical to the corresponding answer stored on the smart card.

24. The smart card of claim 17, wherein m is less than n.

25. The smart card of claim 24, wherein n equals 5.

26. The smart card of claim 17, wherein m equals 3.

27. The smart card of claim 17, wherein the received input instructs the smart card to bypass password entry.

28. The smart card of claim 17, wherein when determining how many of the received answers are correct by comparing the received answers to answers that are stored on the smart card, the smart card is configured to:

weight a first set of the received answers such that a weight associated with the first set of received answers is greater than a weight associated with a second set of received answers;

compare the received answers to answers that are stored on the smart card; and calculate a cumulative score associated with the weight associated with the first set of received answers and the weight associated with the second set of received answers;

wherein if less than m of the cumulative score is correct, the smart card is configured to lock the smart card so that access to the resources on the smart card is blocked to the use.

* * * * *

UNITED STATES PATENT AND TRADEMARK OFFICE
CERTIFICATE OF CORRECTION

PATENT NO. : 7,461,399 B2 Page 1 of 1
APPLICATION NO. : 10/903898
DATED : December 2, 2008
INVENTOR(S) : Juels et al.

It is certified that error appears in the above-identified patent and that said Letters Patent is hereby corrected as shown below:

Claim 9, Column 10, Line 32, "The method of claim 2, ..." should read - The method of claim 6, ...-.

Signed and Sealed this

Twenty-seventh Day of January, 2009

JOHN DOLL
*Acting Director of the United States Patent and Trademark Office*